(12) United States Patent
Hsieh et al.

(10) Patent No.: US 11,402,703 B2
(45) Date of Patent: Aug. 2, 2022

(54) ARRAYS OF ELECTRODES TO CONTROL PIXEL CONTRAST AT DISPLAY DEVICES

(71) Applicant: Hewlett-Packard Development Company, L.P., Spring, TX (US)

(72) Inventors: Hsing-Hung Hsieh, Taipei (TW); Chi Hao Chang, Taipei (TW); Ann Alejandro Villegas, Spring, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/042,155

(22) PCT Filed: Nov. 14, 2018

(86) PCT No.: PCT/US2018/061092
§ 371 (c)(1),
(2) Date: Sep. 27, 2020

(87) PCT Pub. No.: WO2020/101674
PCT Pub. Date: May 22, 2020

(65) Prior Publication Data
US 2021/0263365 A1    Aug. 26, 2021

(51) Int. Cl.
*G02F 1/1343* (2006.01)
*G02F 1/1335* (2006.01)

(52) U.S. Cl.
CPC .... *G02F 1/13439* (2013.01); *G02F 1/133514* (2013.01)

(58) Field of Classification Search
CPC ....................... G02F 1/13439; G02F 1/133514
USPC .......................................................... 349/56
See application file for complete search history.

(56) References Cited

U.S. PATENT DOCUMENTS

| | | | |
|---|---|---|---|
| 5,808,705 A | 9/1998 | Hishida et al. | |
| 7,164,779 B2 | 1/2007 | Yerazunis et al. | |
| 7,400,377 B2 | 7/2008 | Evans et al. | |
| 8,928,567 B2 | 1/2015 | Huang et al. | |
| 9,618,779 B2 | 4/2017 | Xu et al. | |
| 10,008,164 B2 | 6/2018 | Du et al. | |
| 11,188,169 B2 * | 11/2021 | Chung | G02F 1/136222 |
| 2010/0259560 A1 | 10/2010 | Jakobson et al. | |
| 2016/0341987 A1 * | 11/2016 | Chung | G02F 1/134363 |
| 2017/0235188 A1 | 8/2017 | Large | |

FOREIGN PATENT DOCUMENTS

| | | |
|---|---|---|
| CN | 106773373 A | 5/2017 |
| JP | 2006330391 A | 12/2006 |

OTHER PUBLICATIONS

Gass Paul, et al., Privacy LCD Technology for Cellular Phones, Feb. 2007, Sharp Laboratories of Europe Ltd. pp. 45-49.

* cited by examiner

*Primary Examiner* — Nathanael R Briggs
*Assistant Examiner* — William D Peterson
(74) *Attorney, Agent, or Firm* — Perry + Currier Inc.

(57) ABSTRACT

An example device includes a light source, a liquid crystal layer, and an array of pixel electrodes disposed between the light source and the liquid crystal layer. The array of pixel electrodes is to control orientation of liquid crystal of the liquid crystal layer to modulate light incident from the light source to produce an image composed of pixels. The example device further includes an array of scattering electrodes to selectively influence orientation of liquid crystal of the liquid crystal layer to degrade contrast of selected pixels of the image.

15 Claims, 7 Drawing Sheets

ARRAYS OF ELECTRODES TO CONTROL PIXEL CONTRAST AT DISPLAY DEVICES

BACKGROUND

Displays or screens are used in numerous kinds of devices to display information to users. Liquid crystal display (LCD) technology, for example, is in widespread use in devices such as computers, smartphones, televisions, and the like. Advancements in display technologies have may such devices virtually ubiquitous.

DETAILED DESCRIPTION

A display device has a viewing angle that allows a user of the display device to view information displayed. Viewed from outside the viewing angle, information may not be intelligible. A wider viewing angle means that the user may have a greater degree of freedom from which to view the display device. However, a wider viewing angle may also allow for unauthorized observers to more readily view information on the display device. It is not uncommon for passersby to glance at the screen of a user's notebook computer, whether intent is malicious or not. Privacy and information security may suffer.

A display device may provide for control of viewing angle by selectively scattering light emitted by the display device at a controllable area on the display device. The display device may include a second array of pixel electrodes, which may be termed scattering electrodes, that provides localized control of liquid crystal pretilt. For example, in addition to the red, green, and blue channels, a privacy channel may be provided to each pixel. The resolution of the scattering electrodes may be same or coarser than the pixel resolution used to display images.

Figure 1:
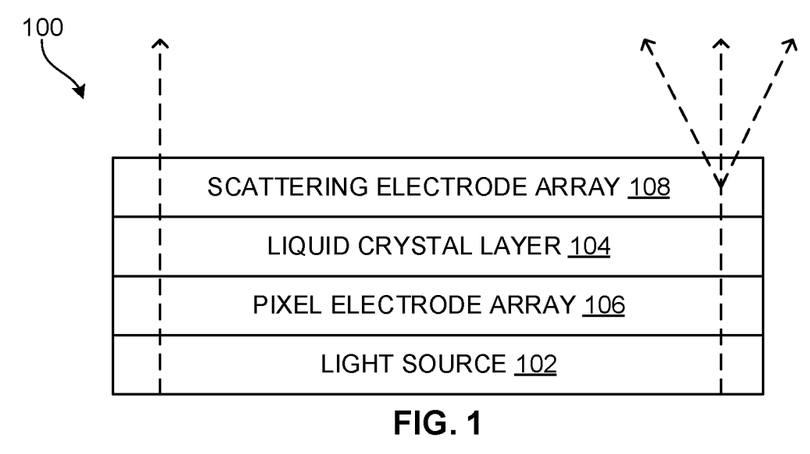
FIG. 1 is a side cross-sectional view of an example device including an array of scattering electrodes to selectively influence orientation of liquid crystal to degrade contrast of selected pixels of an image.

FIG. 1 shows an example device 100. The device 100 may be included as a display device in a computer, smartphone, television, or similar.

The device 100 includes a light source 102, a liquid crystal layer 104, an array of pixel electrodes 106 disposed between the light source 102 and the liquid crystal layer 104, and an array of scattering electrodes 108.

The light source 102 emits light towards the array of pixel electrodes 106. The light source 102 may include a light emitting diode (LED) and a light guide plate. The light source 102 may be referred to as a backlight unit or BLU.

The array of pixel electrodes 106 may be driven an array of thin-film transistors (TFTs). A pixel electrode of the array 106 may be controlled to apply a voltage to a volume of liquid crystal in the liquid crystal layer 104. A volume of liquid crystal may define a pixel and a respective TFT element may be used to modulate an output level for the pixel. Orientation of liquid crystal of the liquid crystal layer 104 may be controlled to modulate light incident from the light source 102 to produce an image composed of pixels.

A pixel electrode may include a set of subpixel electrodes that correspond to primary colors of an additive color model, such as red, green, and blue, and that are controllable to cooperate with a color filter to provide the pixel with a specific color.

The array of scattering electrodes 108 may be positioned adjacent the liquid crystal layer 104 on a side opposite the array of pixel electrodes 106. The array of scattering electrodes 108 is to selectively influence orientation of liquid crystal of the liquid crystal layer 104 to degrade contrast of selected pixels of an image generated by the array of pixel electrodes 106.

The array of scattering electrodes 108 may be driven an array of TFTs. A scattering electrode of the array 108 may be controlled to influence the pretilt of a volume of liquid crystal in the liquid crystal layer 104. Hence, orientation of liquid crystal of the liquid crystal layer 104 may be influenced to cause an image to have an area of degraded contrast.

The array of scattering electrodes 108 may be independently controllable with respect the array of pixel electrodes 106. That is, the pixel electrodes 106 may be controlled to display an image and the scattering electrodes 108 may be controlled to degrade contrast on any pixels of the image.

Figure 2:
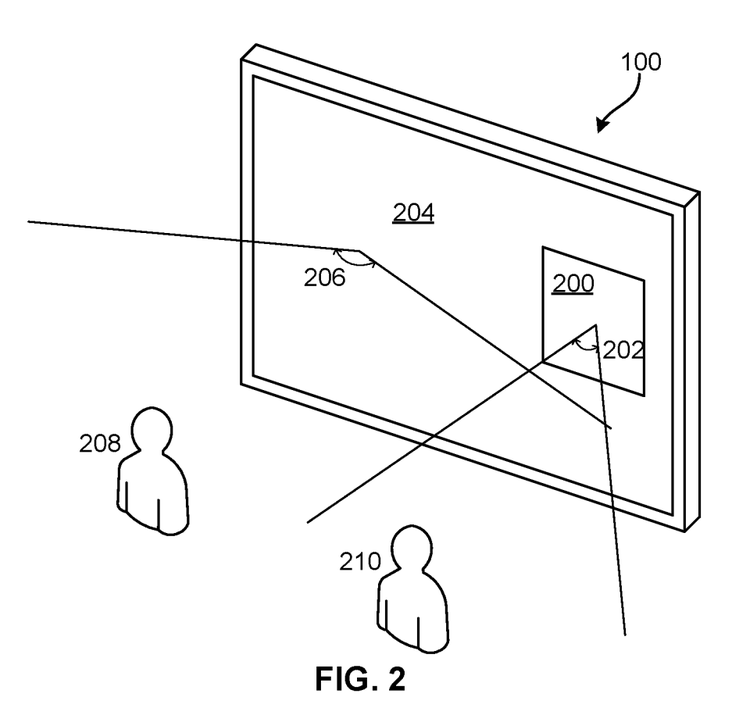
FIG. 2 is a schematic perspective view of the example device of FIG. 1 showing example effective viewing angles.

As shown in FIG. 2, an area 200 of selected pixels with degraded contrast has a narrower viewing angle 202 than an area 204 of pixels without degraded contrast that has a wider viewing angle 206. Hence, such an area 200 is less intelligible to a nearby observer 208 outside the viewing angle 202 and may appear as a white patch to such an observer 208, while the area 204 without degraded contrast may still be intelligible. An intended observer 210, such as the operator of the device 100, that views the device 100 within the narrower viewing angle 202 may be able to clearly see both areas 200, 204.

Any number, size, and shape of areas may be controlled to have degraded contrast.

Degradation of contrast may be such that a contrast ratio (e.g., a ratio of white intensity to black intensity) of a particular pixel is degraded from, for example, 600:1 in a normal viewing mode to, for example, 2:1 in a private viewing mode.

Figure 3:
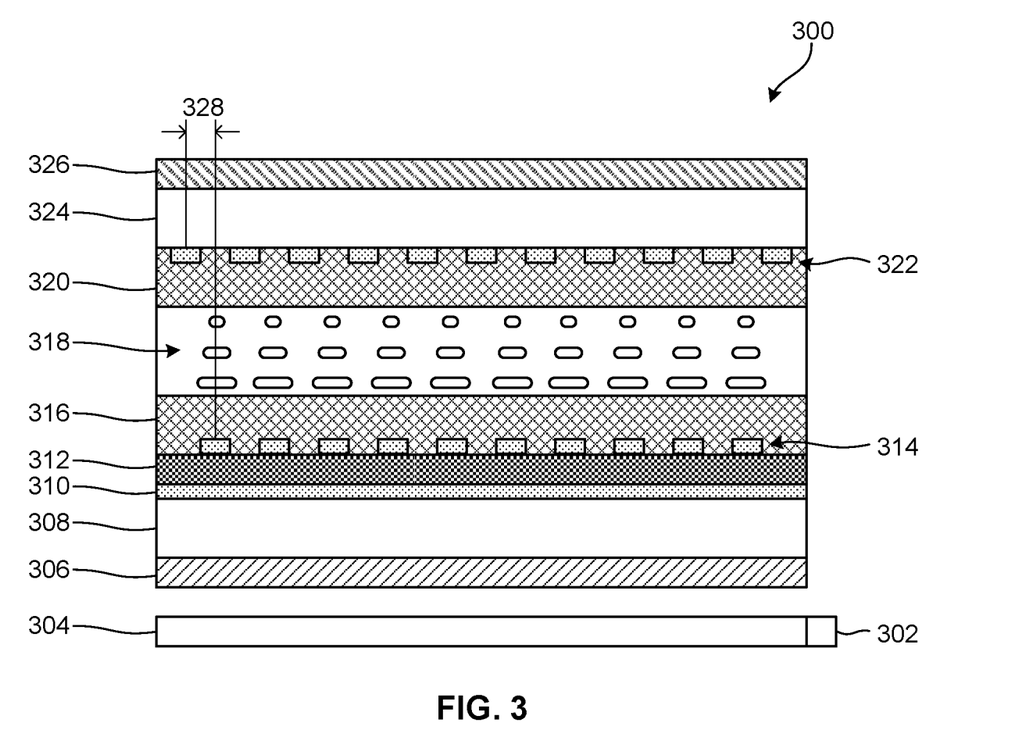
FIG. 3 is a side cross-sectional view of an example device including an array of scattering electrodes and an array of pixel electrodes that share a common electrode.

FIG. 3 shows another example device 300. The device 300 may be included as a display device in a computer, smartphone, television, or similar. Features and aspects of the device 300 are similar to the other devices described herein and only differences are described in detail for sake of clarity, with like reference numerals denoting like components.

The device 300 includes a light source 302, a light guide plate 304, a first polarizer 306, a first substrate 308, a common electrode 310, an electrical insulator 312, an array of pixel electrodes 314, a first alignment layer 316, a liquid crystal layer 318, a second alignment layer 320, an array of scattering electrodes 322, a second substrate 324, and a second polarizer 326. The arrays of electrodes 314, 322 are two-dimensional and extend in a direction illustrated and a perpendicular direction into the plane of the figure.

The light source 302 may include an LED or similar device. The light source provides light to the light guide plate 304. The light guide plate 304 may evenly illuminate the first polarizer 306.

The first polarizer 306 and second polarizer 326 may be mutually perpendicular, such that without influence of the liquid crystal layer 318 light passing through the first polarizer would be blocked by the second polarizer 326. In other examples, the first polarizer 306 and second polarizer 326 may be mutually parallel, such that with influence of the liquid crystal layer 318 light passing through the first polarizer would be blocked by the second polarizer 326. The first polarizer 306 provides polarized light to the first substrate 308, which may be glass. The second polarizer 326 may be disposed at the second substrate 324, which may be glass, and outputs light to an observer.

The common electrode 310 may be disposed on the first substrate 308. The common electrode 310 may be shared by both arrays of electrodes 314, 322, in that an electrode of an array 314, 322 may have its bias controlled relative to the common electrode 310. The common electrode 310 may be a transparent electrode.

The array of pixel electrodes 314 may be separated from the common electrode 310 by the insulator 312. The pixel electrodes 314 may be transparent electrodes. The pixel electrodes 314 may be controlled by an array of switches, such as a TFT array (not shown for clarity).

A pixel electrode 314 may be controllably provided with a voltage relative to the common electrode 310 to control orientation of liquid crystal of the liquid crystal layer 318 to modulate light incident from the first polarizer 306, such that a degree of polarization may be applied to allow an amount of light to pass through the second polarizer 326 and thus be visible to an observer. The array of pixel electrodes 314 may be so controlled to display an arbitrary image.

The alignment layers 316, 320 sandwich the liquid crystal layer 318, which contains a suitable kind of liquid crystal. An alignment layer 316, 320 may be structured to induce a particular alignment, or pretilt, of liquid crystal molecules at or near the surface of the layer 316, 320. An alignment layer 316, 320 may include polymer material disposed onto a respective substrate 308, 324 over respective arrays of electrodes 314, 322.

The array of scattering electrodes 322 may be disposed on a side of the second substrate 324 opposite the second polarizer 326. The scattering electrodes 322 may be transparent electrodes.

The array of scattering electrodes 322 may be controlled to selectively influence orientation of liquid crystal of the liquid crystal layer 318 to degrade contrast of selected pixels of the image generated by the array of pixel electrodes 314. A scattering electrode 322 may be controllably provided with a voltage relative to the common electrode 310 to influence orientation, or pretilt, of liquid crystal of the liquid crystal layer 318 near the second alignment layer 320. This may cause light of a respective pixel to scatter thereby narrowing the pixel's effective viewing angle. The pixel may appear white to observers outside the pixel's effective viewing angle.

Figure 4:
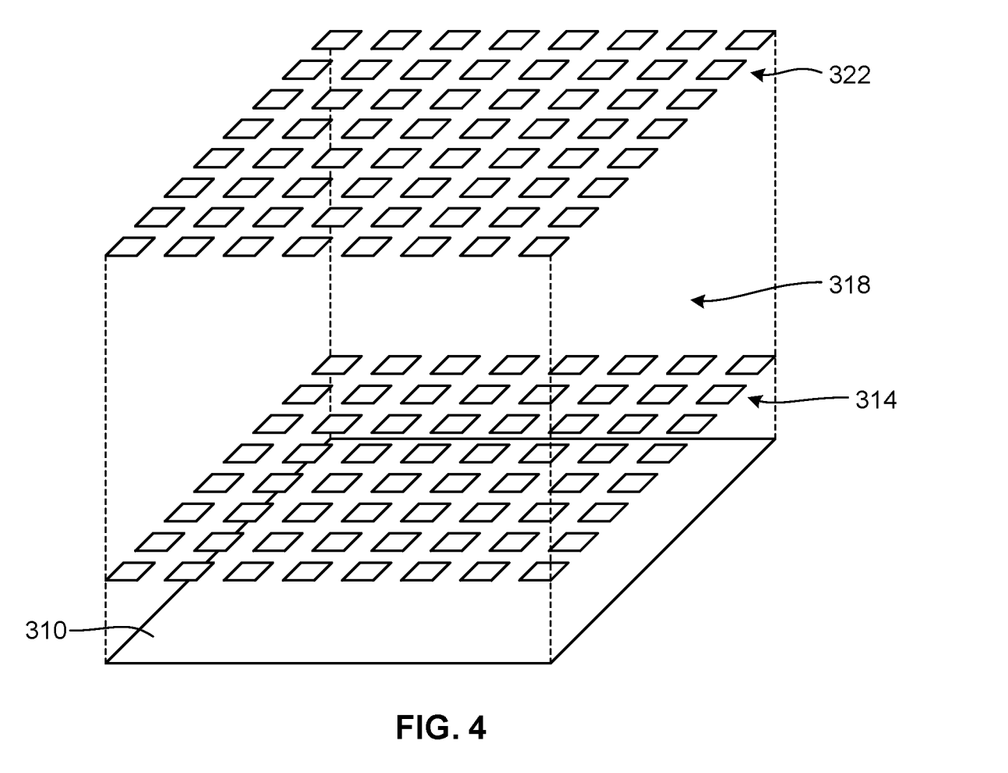
FIG. 4 is a schematic perspective view of the electrodes of FIG. 3.

A particular scattering electrode may correspond to a particular pixel electrode, such that the scattering electrode controls the viewing angle of the particular pixel. Further, in this example, as shown in FIG. 4, each scattering electrode corresponds to a different pixel electrode, such that the two-dimensional resolution of viewing angle control is the same as the two-dimensional resolution of images displayable by the device 300. That is, each pixel may have its contrast controllably degraded, so as to implement pixel-level control of viewing angle and therefore privacy.

In addition, as illustrated in FIG. 3, a scattering electrode may be laterally separated by a distance 328 from a corresponding pixel electrode in a direction perpendicular to a direction of light incident from the light guide plate 304. The arrays of electrodes may be mutually laterally separated by such a distance 328.

Figure 5:
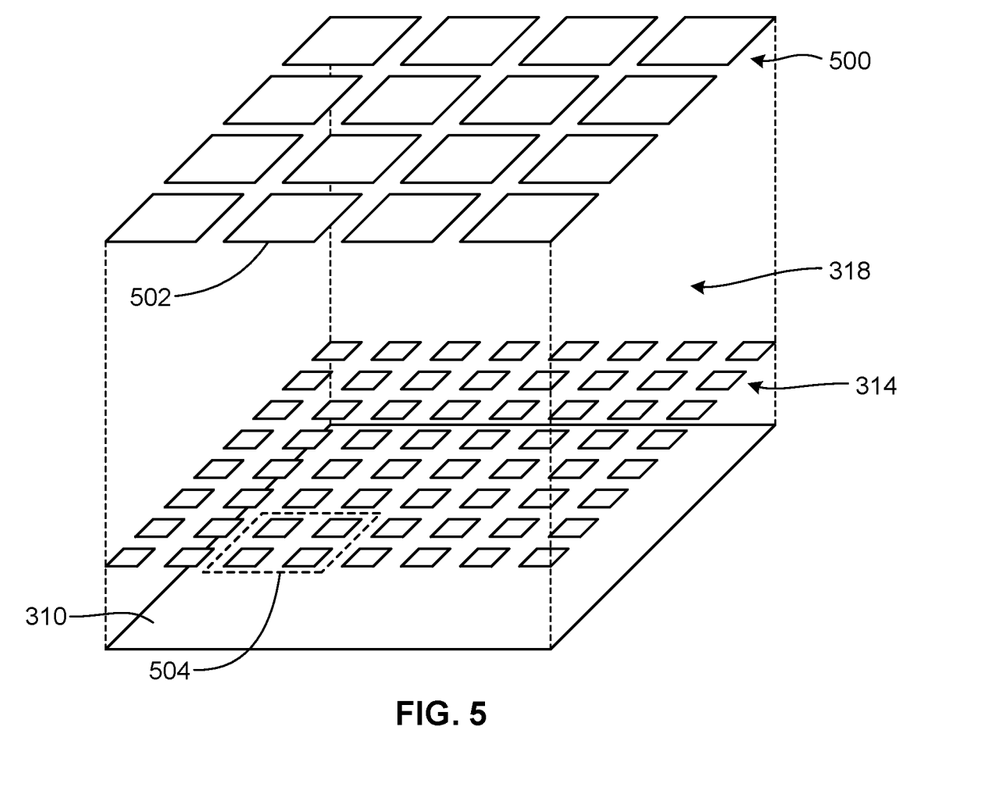
FIG. 5 is a schematic perspective view of a scattering electrode corresponding to a group of pixel electrodes.

As shown in FIG. 5, an array of scattering electrodes 500 may have an arrangement different from an array of pixel electrodes 314. A scattering electrode may be larger than a pixel electrode. A particular scattering electrode 502 may correspond to a group 504 of pixel electrodes. Such a group 504 may have any suitable number of pixel electrodes and pixel dimensions, such as four pixel electrodes in a 2-by-2 arrangement (as shown), 12 pixel electrodes in a 4-by-3 arrangement, 16 pixel electrodes in a 4-by-4 arrangement, 144 pixel electrodes in a 16-by-9 arrangement, or similar. As such, control of contrast, and therefore privacy, may be implemented at a resolution that is coarser than image resolution.

Figure 6:
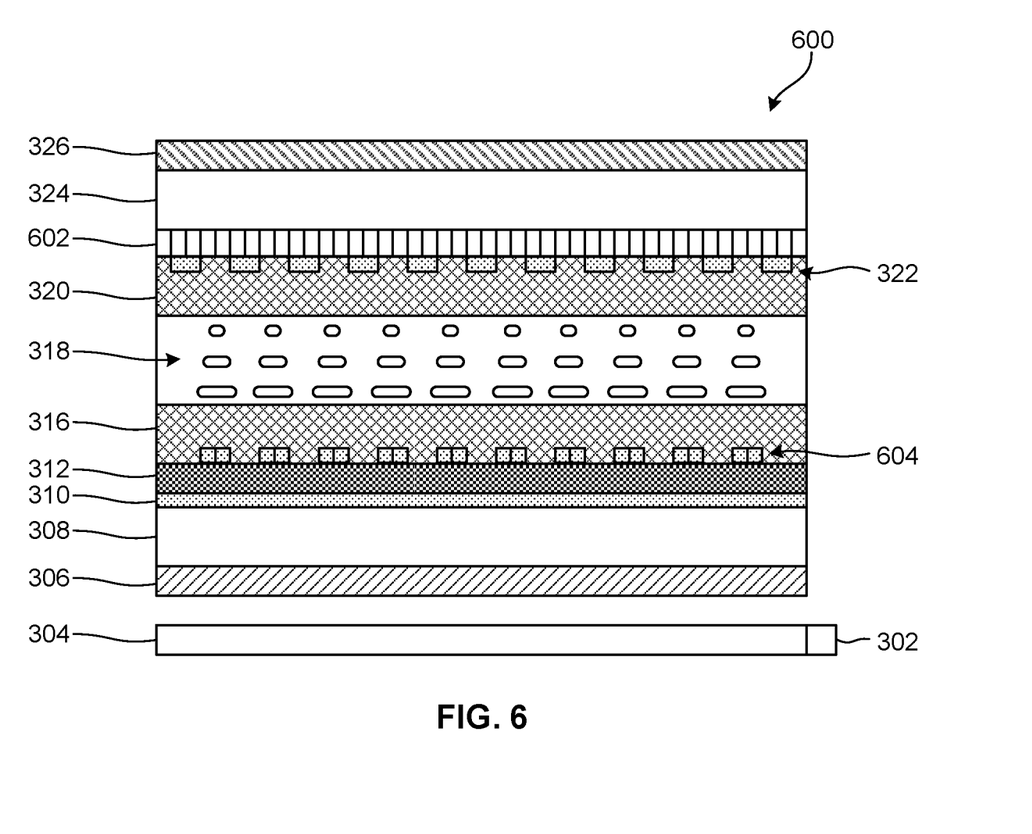
FIG. 6 is a side cross-sectional view of an example device including an array of scattering electrodes and an array of pixel electrodes having color subpixel electrodes.

FIG. 6 shows another example device 600. The device 600 may be included as a display device in a computer, smartphone, television, or similar. Features and aspects of the device 600 are similar to the other devices described herein and only differences are described in detail for sake of clarity, with like reference numerals denoting like components.

The device 600 includes a color filter 602 positioned between a second polarizer 326, which outputs light to an observer, and a liquid crystal layer 318, which modulates the light outputted. The color filter 602 may be disposed on a second substrate 324 or may form the second substrate 324.

The device 600 further includes an array of pixel electrodes 604, in which each pixel electrode includes a set of subpixel electrodes that correspond to primary colors of an additive color model, such as red, green, and blue. The subpixel electrodes are controllable to cooperate with the color filter 602 to provide a particular pixel with a specific color.

The device 600 further includes an array of scattering electrodes 322. A particular scattering electrode may correspond to a set of subpixel electrodes of a given pixel. As such, contrast ratio may be controlled for a pixel's color as defined by voltages at the subpixel electrodes. Each scattering electrode may correspond to a different set of subpixel electrodes, such that privacy is controllable at image resolution. Sets of subpixels may be grouped to a given scattering electrode, as described elsewhere herein, to provide coarser control of privacy.

Figure 7:
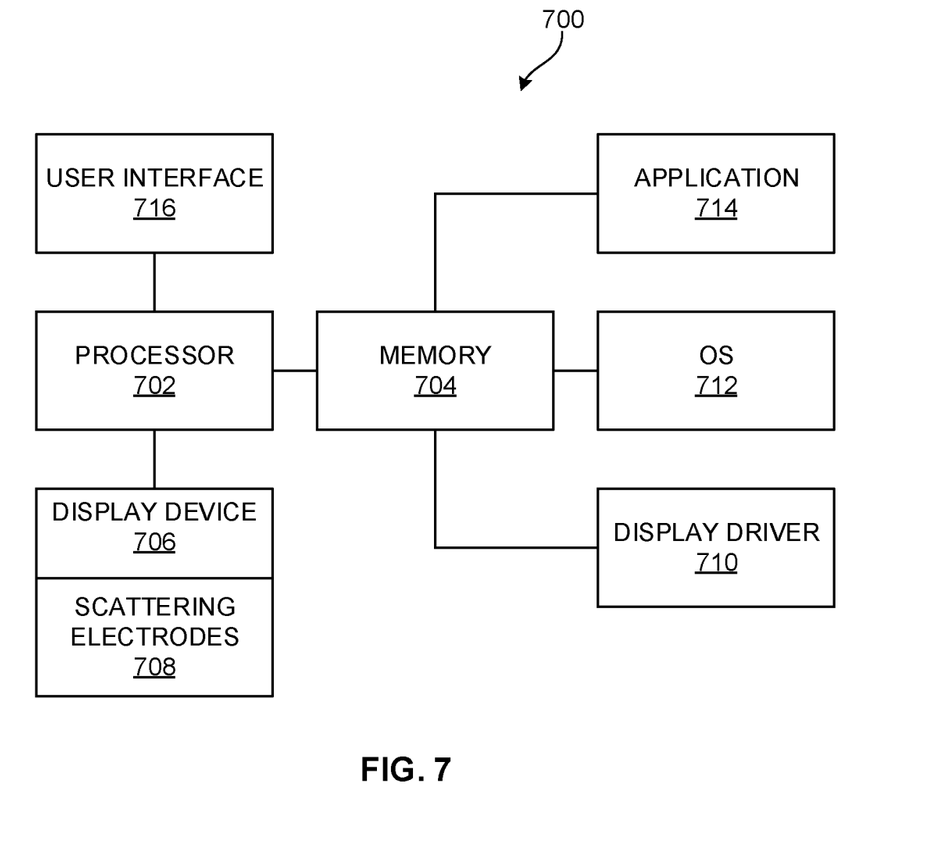
FIG. 7 is a block diagram of a computer or similar device that includes a display device that has an array of scattering electrodes.

FIG. 7 shows a device 700 that includes a privacy display as described elsewhere herein. The device 700 may be a computer, smartphone, television, or similar.

The device 700 includes a processor 702, memory 704, and display device 706. The processor 702 may be connected to the memory 704 and the display device 706.

The processor 702 may include a central processing unit (CPU), a microcontroller, a microprocessor, a processing core, a field-programmable gate array (FPGA), or a similar device capable of executing instructions. The processor 702 may cooperate with the memory 704 to execute instructions that may be stored in the memory 704. The memory may include a non-transitory machine-readable medium that may be an electronic, magnetic, optical, or other physical storage device that encodes executable instructions. The machine-readable medium may include, for example, random access memory (RAM), read-only memory (ROM), electrically-erasable programmable read-only memory (EEPROM), flash memory, a storage drive, an optical disc, or similar.

The display device 706 is a liquid crystal display (LCD) that includes an array of scattering electrodes 708 as described elsewhere herein. The scattering electrodes 708 may be controlled by the processor 702, or a display-specific processor, to selectively influence liquid crystal of the display device 706 to degrade contrast of selected pixels of the images displayed by the display device 706. Any arbitrary area displayed at the display device 706 may be controlled to display imagery with degraded contrast.

The device 700 may further include a display driver 710 to control the display device 706 and scattering electrodes 708. The display driver 710 may expose control of the scattering electrodes 708 to an operating system 712 executable at the device 700. The operating system 712 may expose control of the scattering electrodes 708 to an application 714 executable at the device 700.

In one example, an email application may provide an option to activate scattering electrodes 708 at the location of an email message on the display device 706. As such, the user of the device 700 may be able to clearly read the email, while observers outside the narrower viewing angle provided by the scattering electrodes may only be able to see the user's desktop or other applications.

In another example, a web browser activates scattering electrodes 708 at password fields, so that a user of the device 700 may be able to read his/her password as it is typed in, while observers outside the narrower viewing angle may only see a small white patch of screen.

In still another example, an operating system provides a selectable area on the display device 706 to activate scattering electrodes 708. A filter may therefore be activated and moved around the screen as desired by the user.

The device 700 may further include a user interface 716, such as a keyboard, touchscreen elements of the display device 706, a microphone, or similar. The operating system 712 may allow control of the scattering electrodes 708 via the user interface 716. For example, a keyboard key may be mapped to a subset of the scattering electrodes 708, such that a particular area of the display device 706 may be switched into a privacy mode on the press of the key.

Figure 8:
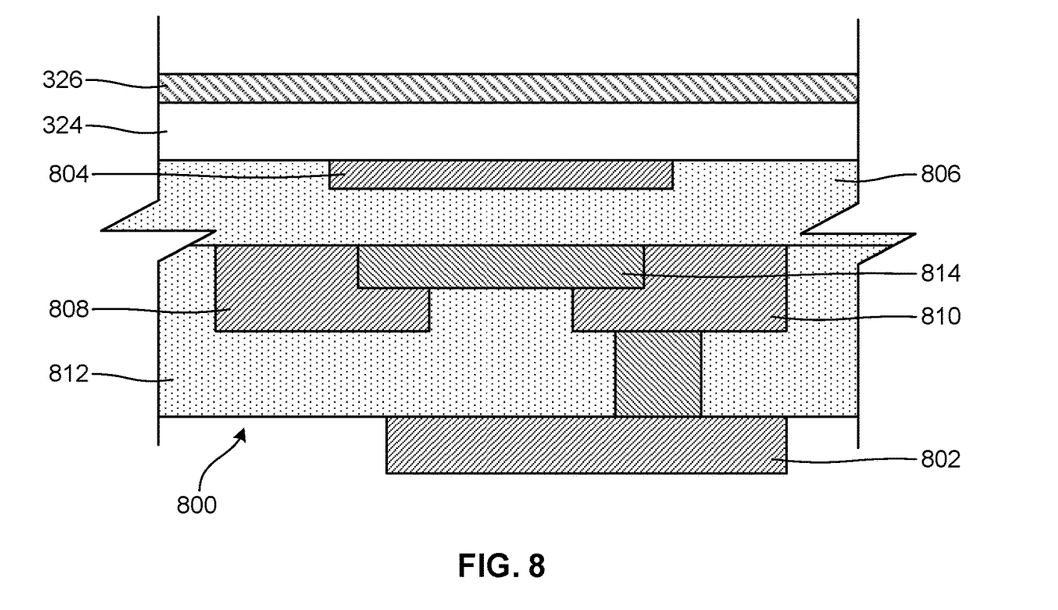
FIG. 8 is a side cross-sectional view of an example transistor device to control a scattering electrode to selectively influence orientation of liquid crystal to degrade contrast of a selected pixel of an image.

FIG. 8 shows an example TFT device 800 that may be used to control a scattering electrode 802, such as an electrode of an array of scattering electrodes described elsewhere herein. An array of such TFT devices 800 may be provided to control an array of scattering electrodes. In addition, the TFT device 800 or a similar device may be used to control a pixel electrode.

The TFT device 800 incudes a gate 804, such as a layer of indium tin oxide (ITO), provided to a substrate 324 that may carry a polarizer 326 that outputs modulated light to be viewed by a user. The gate 804 may be embedded in an insulator or dielectric 806.

The TFT device 800 further incudes a source 808 and drain 810 proximate to the gate 804 and embedded in an insulator or dielectric 812. The drain 810 is connected to the scattering electrode 802. A channel 814 is provided between the source 808 and drain 810.

The TFT device 800 may be controlled to charge/discharge the scattering electrode 802 to control contrast degradation of a corresponding pixel or group of pixels of a display device. The TFT device 800 may be controlled independently from a pixel electrode or subpixel electrodes.

It should be apparent from the above that scattering electrodes may be provided to a display device to selectively control pixel contrast degradation to selectively secure information displayed at an arbitrary location on the display device against unauthorized viewing by nearby observers. Flexible pixel-level control of a white-type privacy mode may be provided in a readily controllable manner. A relatively small area of a display device may have scattering electrodes activated and this may be less noticeable to nearby observers, thereby reducing the chance that a nearby observer may notice that the user of the display device has a privacy mode activated. Moreover, activating scattering electrodes at a relatively small area of a display device may reduce power consumption as compared to activating scattering electrodes at the entire display device.

It should be recognized that features and aspects of the various examples provided above can be combined into further examples that also fall within the scope of the present disclosure. In addition, the figures are not to scale and may have size and shape exaggerated for illustrative purposes.

The invention claimed is:

1. A method comprising:
   at a device comprising: a light source; a liquid crystal layer; an array of pixel electrodes disposed between the light source and the liquid crystal layer; and an array of scattering electrodes, controlling the array of pixel electrodes to control orientation of liquid crystal of the liquid crystal layer to modulate light incident from the light source to produce an image composed of pixels; and
   controlling the array of scattering electrodes to selectively influence orientation of liquid crystal of the liquid crystal layer to degrade contrast of a selected subset of the pixels of the image, an area of the selected subset of the pixels being smaller than the image.

2. The method of claim 1, wherein a scattering electrode of the array of scattering electrodes corresponds to a pixel electrode of the array of pixel electrodes.

3. The method of claim 2, wherein each scattering electrode of the array of scattering electrodes corresponds to a different pixel electrode of the array of pixel electrodes.

4. The method of claim 1, wherein a scattering electrode of the array of scattering electrodes corresponds to a group of pixel electrodes of the array of pixel electrodes.

5. The method of claim 1, wherein the device further comprises a color filter, wherein a pixel electrode of the array of pixel electrodes comprises a set of subpixel electrodes, wherein a scattering electrode of the array of scattering electrodes corresponds to the set of subpixel electrodes.

6. The method of claim 1, wherein the device further comprises a common electrode shared by the array of pixel electrodes and the array of scattering electrodes.

7. The method of claim 1, wherein a scattering electrode of the array of scattering electrodes is laterally separated from a pixel electrode of the array of pixel electrodes in a direction perpendicular to a direction of light incident from the light source.

8. A method comprising:
   at device comprising: a liquid crystal layer; an array of pixel electrodes at the liquid crystal layer, the array of pixel electrodes; and a two-dimensional array of additional electrodes at the liquid crystal layer, controlling orientation of liquid crystal of the liquid crystal layer to modulate light to produce an image composed of pixels; and controlling the two-dimensional array of additional electrodes at the liquid crystal layer, to selectively influence orientation of liquid crystal of the liquid crystal layer to control contrast of a selected subset of the pixels of the image, the two-dimensional array of additional electrodes independently controllable from the array of pixel electrodes, an area of the selected subset of the pixels being smaller than the image.

9. The method of claim 8, wherein the two-dimensional array of additional electrodes has a same resolution as the array of pixel electrodes.

10. The method of claim 8, wherein the two-dimensional array of additional electrodes has a resolution that is coarser than a resolution of the array of pixel electrodes.

11. The method of claim 8, wherein the device further comprises a color filter, wherein a pixel electrode of the array of pixel electrodes comprises a set of subpixel electrodes, wherein an electrode of the two-dimensional array of additional electrodes corresponds to the set of subpixel electrodes.

12. The method of claim 8, wherein the device further comprises a common electrode shared by the array of pixel electrodes and the two-dimensional array of additional electrodes.

13. A method comprising:

at a device comprising: a liquid crystal display; and a two-dimensional array of scattering electrodes at the liquid crystal display, controlling the two-dimensional array of scattering electrodes to selectively influence orientation of liquid crystal to control viewing angle of a selected subset of pixels of an image formed by the liquid crystal display, an area of the selected subset of the pixels being smaller than the image; and independently controlling the two-dimensional array of scattering electrodes from a pixel array of the liquid crystal display.

14. The method of claim 13, wherein the two-dimensional array of scattering electrodes has a same resolution as the pixel array of the liquid crystal display.

15. The method of claim 13, wherein the device further comprises a processor connected to the two-dimensional array of scattering electrodes, the processor to execute a display driver that provides control of the two-dimensional array of scattering electrodes to an operating system, an application, or both.

\* \* \* \* \*